(12) United States Patent
Hooli et al.

(10) Patent No.: US 11,844,108 B2
(45) Date of Patent: Dec. 12, 2023

(54) CHANNEL ACCESS FOR SEMI-STATIC UPLINK RESOURCES

(71) Applicant: NOKIA TECHNOLOGIES OY, Espoo (FI)

(72) Inventors: Kari Juhani Hooli, Oulu (FI); Vitaly Petrov, Espoo (FI); Timo Erkki Lunttila, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 361 days.

(21) Appl. No.: 17/340,564

(22) Filed: Jun. 7, 2021

(65) Prior Publication Data
US 2022/0394767 A1    Dec. 8, 2022

(51) Int. Cl.
| H04W 74/08 | (2009.01) |
| H04W 74/00 | (2009.01) |
| H04W 72/044 | (2023.01) |
| H04W 72/0446 | (2023.01) |
| H04W 72/23 | (2023.01) |

(52) U.S. Cl.
CPC ..... H04W 74/0816 (2013.01); H04W 72/046 (2013.01); H04W 72/0446 (2013.01); H04W 72/23 (2023.01); H04W 74/004 (2013.01)

(58) Field of Classification Search
None
See application file for complete search history.

(56) References Cited

U.S. PATENT DOCUMENTS

| 10,687,362 | B2 | 6/2020 | Sun et al. | |
| 2020/0359411 | A1* | 11/2020 | Li | H04W 16/14 |
| 2020/0396767 | A1* | 12/2020 | Talarico | H04W 74/0808 |
| 2021/0105815 | A1* | 4/2021 | Salem | H04W 74/0875 |
| 2021/0298080 | A1* | 9/2021 | Wu | H04W 74/0808 |
| 2021/0392685 | A1* | 12/2021 | Myung | H04W 72/1263 |
| 2022/0353894 | A1* | 11/2022 | Nogami | H04L 5/0053 |
| 2022/0377791 | A1* | 11/2022 | Nogami | H04W 24/10 |
| 2022/0377813 | A1* | 11/2022 | Wang | H04W 72/0453 |
| 2023/0055275 | A1* | 2/2023 | Xu | H04W 72/23 |

(Continued)

FOREIGN PATENT DOCUMENTS

WO    2021/038121 A1    3/2021

OTHER PUBLICATIONS

Huawei, HiSilicon, "Coexistence and channel access for NR unlicensed band operations", 3GPP TSG RAN WG1 Meeting #98, R1-1908109, Aug. 26, 2019.

(Continued)

*Primary Examiner* — Bob A Phunkulh
(74) *Attorney, Agent, or Firm* — SQUIRE PATTON BOGGS (US) LLP (57) ABSTRACT

Systems, methods, apparatuses, and computer program products for channel access for semi-static uplink (UL) resources are provided. One method may include receiving, at a user equipment, an indication of at least one of time portions of channel occupancy time (COT) where the user equipment can use a first type of channel access for configured uplink (CUL) transmission or time portions where a second type of channel access is required prior to the configured uplink (CUL) transmission. The method may then include, based on the received indication, determining a channel access mechanism to use when transmitting on a configured uplink (CUL) resource.

19 Claims, 4 Drawing Sheets

(56) References Cited

U.S. PATENT DOCUMENTS

| | | | |
|---|---|---|---|
| 2023/0156788 A1* | 5/2023 | Lunttila | H04W 74/0808 |
| | | | 370/329 |
| 2023/0180260 A1* | 6/2023 | Nogami | H04L 5/0051 |
| | | | 370/329 |
| 2023/0199833 A1* | 6/2023 | Xu | H04W 74/0808 |
| | | | 370/329 |
| 2023/0239079 A1* | 7/2023 | Babaei | H04W 72/56 |
| | | | 370/329 |
| 2023/0262764 A1* | 8/2023 | Myung | H04W 74/0808 |
| | | | 370/329 |
| 2023/0269486 A1* | 8/2023 | Xiao | H04N 23/73 |
| | | | 348/222.1 |

* cited by examiner

CHANNEL ACCESS FOR SEMI-STATIC UPLINK RESOURCES

FIELD

Some example embodiments may generally relate to communications including mobile or wireless telecommunication systems, such as Long Term Evolution (LTE) or fifth generation (5G) radio access technology or new radio (NR) access technology, or other communications systems. For example, certain example embodiments may generally relate to systems and/or methods for channel access for semi-static uplink (UL) resources.

BACKGROUND

Examples of mobile or wireless telecommunication systems may include the Universal Mobile Telecommunications System (UNITS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher, and can support at least service categories such as enhanced mobile broadband (eMBB) and ultra-reliable low-latency-communication (URLLC) as well as massive machine type communication (mNITC). NR is expected to deliver extreme broadband and ultra-reliable, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

SUMMARY

An embodiment may be directed to a method, which may include receiving, at a user equipment, an indication of at least one of time portions of channel occupancy time (COT) where the user equipment can use a first type of channel access for configured uplink (CUL) transmission or time portions where a second type of channel access is required prior to the configured uplink (CUL) transmission. Based on the received indication, the method may include determining a channel access mechanism to use when transmitting on a configured uplink (CUL) resource.

An embodiment may be directed to a method, which may include transmitting, to a user equipment, an indication of at least one of time portions of channel occupancy time (COT) where the user equipment can use a first type of channel access for configured uplink (CUL) transmission or time portions where a second type of channel access is required prior to the configured uplink (CUL) transmission. The method may also include receiving, at a network node, configured uplink (CUL) transmission from the user equipment based on the indication.

An embodiment may be directed to an apparatus, which may include at least one processor and at least one memory comprising computer program code. The at least one memory and computer program code configured, with the at least one processor, to cause the apparatus at least to perform: receiving an indication of at least one of time portions of channel occupancy time (COT) where the apparatus can use a first type of channel access for configured uplink (CUL) transmission or time portions where a second type of channel access is required prior to the configured uplink (CUL) transmission and, based on the received indication, determining a channel access mechanism to use when transmitting on a configured uplink (CUL) resource.

An embodiment may be directed to an apparatus, which may include at least one processor and at least one memory comprising computer program code. The at least one memory and computer program code configured, with the at least one processor, to cause the apparatus at least to perform: transmitting, to a user equipment, an indication of at least one of time portions of channel occupancy time (COT) where the user equipment can use a first type of channel access for configured uplink (CUL) transmission or time portions where a second type of channel access is required prior to the configured uplink (CUL) transmission, and receiving configured uplink (CUL) transmission from the user equipment based on the indication.

An embodiment may be directed to an apparatus that may include means for receiving an indication of at least one of time portions of channel occupancy time (COT) where the apparatus can use a first type of channel access for configured uplink (CUL) transmission or time portions where a second type of channel access is required prior to the configured uplink (CUL) transmission. Based on the received indication, the apparatus may include means for determining a channel access mechanism to use when transmitting on a configured uplink (CUL) resource.

An embodiment may be directed to an apparatus that may include means for transmitting, to a user equipment, an indication of at least one of time portions of channel occupancy time (COT) where the user equipment can use a first type of channel access for configured uplink (CUL) transmission or time portions where a second type of channel access is required prior to the configured uplink (CUL) transmission. The apparatus may also include means for receiving configured uplink (CUL) transmission from the user equipment based on the indication.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for channel access for transmissions using semi-static uplink (UL) resources, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

Certain example embodiments may relate to NR channel access, for example, at 60 GHz unlicensed band. In particular, some embodiments may relate to channel access in case of configured grant (CG) physical uplink shared channel (PUSCH). Hence, example embodiments may be relevant for 3GPP Release-17 including a work item relating to extending current NR operation to 71 GHz. One of the objectives of this work item includes channel access mechanism assuming beam based operation in order to comply with the regulatory requirements applicable to unlicensed spectrum for frequencies between 52.6 GHz and 71 GHz. In general, this can be seen to be relevant for configured uplink (CUL) transmission in beam based system operating on unlicensed band requiring LBT.

Configured UL transmissions include transmissions that have semi-static or semi-persistent periodic resource configured, but the transmissions are not necessarily periodic. Such transmissions may be CG PUSCH, scheduling request (SR), sounding reference signal (SRS), periodic or semi-persistent channel state information (CSI), as well as physical random access channel (PRACH).

Focusing on CG PUSCH, a NR UE may be configured with semi-static (Type 1 CG PUSCH) or semi-persistent PUSCH resources (Type 2 CG PUSCH). In the case of Type 1 CG PUSCH, the UE receives the transmission parameters via radio resource control (RRC) information element configuredGrantConfig including rrc-ConfiguredUplinkGrant. In the case of Type 2 CG PUSCH, the UE receives configuredGrantConfig without rrc-ConfiguredUplinkGrant. The corresponding parameters are provided by UL grant in DCI also activating the Type 2 CG PUSCH resource. In both cases, some of the transmission parameters are also provided by pusch-Config. Further, the UE may support multiple active CG PUSCH resource configurations on the same bandwidth part (BWP) for, e.g., different traffic types, enhancing reliability and latency for a corresponding traffic type.

A benefit of CG PUSCH is the reduced latency, as a UE may transmit PUSCH directly without the need to transmit SR first and then wait for UL grant. In case of unlicensed band operation, the latency benefit is further accentuated as only one acquisition of channel access is required instead of three. The drawback is increased resource consumption and reduced flexibility in dynamic time domain scheduling (due to semi-static allocation of resources).

It has been agreed that NR supports a channel access mode without transmitter listen before talk (LBT), as well as a channel access mode with transmitter LBT. The further rules for the use of these modes are currently being considered. Some embodiments may focus on the channel access mode based on LBT.

3GPP has categorized different transmitter channel access mechanisms (e.g., in 3GPP TR 36.889). In particular, the channel access schemes for NR unlicensed spectrum (NR-U) are categorized into category 1 (Cat-1), category 2 (Cat-2), category 3 (Cat-3), and category 4 (Cat-4). Cat-1 refers to immediate transmission after a short switching gap, which may be used for a transmitter to immediately transmit after a switching gap inside a channel occupancy time (COT). The switching gap from reception to transmission is to accommodate the transceiver turnaround time and may be limited e.g. to 16 µs. Cat-2 refers to LBT without random back-off. Cat-3 refers to LBT with random back-off with a contention window of fixed size. Cat-4 refers to LBT with random back-off with a contention window of variable size. For different transmissions and different channels/signals to be transmitted, different categories of channel access schemes can be used.

In Release-16 NR-U, supporting 5 GHz unlicensed band, device acquiring channel access uses Cat-4 or, in some specific cases, Cat-1 or Cat-2 channel access. A UE responding to gNB as part of shared COT may use either Cat-2 ("single LBT sensing") or Cat-1 ("no LBT") channel access based on gNB indication. In 3GPP TS 37.213, Cat-4 and Cat-1 channel access are specified as Type 1 and Type 2C channel access. Type 2A and Type 2B channel access schemes fall into Cat-2 channel access category. In case of NR on 60 GHz band, either Cat-3 or Cat-4 channel access may be used when acquiring channel access and initiating a COT.

It has been agreed that the baseline energy detection threshold (EDT) can be determined as follows:

$$EDT = -80 \text{ dBm} + 10*\log10\left(\frac{P\text{max}}{P\text{out}}\right) +$$
$$10*\log10(\text{Operating Channel } BW \text{ in MHz})$$

where Pout is RF output power (EIRP) and Pmax is the RF output power limit, where Pout≤Pmax. Further, there is a working assumption that Pout in EDT determination is defined as the maximum EIRP of the node determining EDT during a COT. Based on this agreement, it is clear that the EDT depends on the EIRP and, correspondingly, on transmit power of the following transmission.

It has been agreed that a UE can share gNB initiated COT without UE LBT when the interval between the downlink (DL) transmission and the UL transmission is up to a maximum gap. Some alternatives for the gap have been identified. Under a first alternative, no maximum gap is defined and a later transmission can share the COT without LBT with any gap within the maximum COT duration. Under another alternative, a maximum gap Y is defined, such that a later transmission can share the COT without LBT if the later transmission starts within Y from the end of the earlier transmission. If the later transmission starts after Y from the end of the earlier transmission, a one-shot LBT is needed to share the COT.

gNB beam switching within COT has also been discussed in the context of LBT requirements. Specifically, within a COT with TDM of beams with beam switching one or more of the following LBT operations may be down-selected. Under a first alternative, single LBT sensing with wide beam 'cover all beams to be used in the COT with appropriate ED threshold. Under a second alternative, independent per-beam LBT sensing at the start of COT is performed for beams used in the COT. Under a third alternative, independent per-beam LBT sensing at the start of COT is performed for beams used in the COT with additional requirement on Cat-2 channel access before beam switch.

When focusing on the alternative for COT sharing where a maximum gap is defined and the third alternative for LBT operations in case of TDM of beams within a COT, a UE transmitting on UL may need to perform three kinds of channel access mechanisms: Cat-3 or Cat-4 channel access for acquiring channel access and initiating COT, Cat-1 channel access when sharing gNB initiated COT within a maximum gap, and Cat-2 channel access when sharing gNB initiated COT with a gap exceeding a maximum value or after gNB beam switch (in case of TDM of gNB beams). In case of dynamic scheduling, a UE can trust that gNB indicates the appropriate channel access mechanism in the UL grant DCI. However, a solution is needed for how the UE would know the proper channel access mechanism for CUL resource. Certain embodiments described below may address at least the problems outlined above, in addition to other issues which may not be explicitly outlined herein.

According to an embodiment, a gNB may indicate time portions (slots, symbols) of gNB initiated COT in which a UE can use Cat-1 ("No LBT") channel access for CUL transmission, as well as time portions where Cat-2 ("single LBT sensing") channel access is required prior to CUL transmission. This may be done in addition to indication of COT duration. In some embodiments, the indicated time portions may be specific for a certain gNB beam (e.g., corresponding to SSB beams). In other words, the UE may assume Cat-1 channel access during these portions on beam pairs associated to the beam on which the indication was received. Based on the received indications, the UE may determine the channel access mechanism to be used when transmitting on CUL resource.

In certain embodiments, the indication may be done via GC-PDCCH, which may be (SSB) beam specific, meaning that gNB may transmit different GC-PDCCH content on different SSB beams. Example embodiments provide several options for the indication. For instance, in one embodiment, the indication may be via detection of GC-PDCCH alone. The UE may use Cat-1 channel access during a predefined (standardized or configured) time window after the latest received GC-PDCCH. The time window may be determined as a number of slots or as number of slots containing UL resources (or UL and flexible resources) but conditioned to be within COT duration. It may also be a predefined portion or share of remaining COT duration.

In another embodiment, the indication may be provided via a separate GC-PDCCH field indicating a time window with a duration of N slots. Cat-1 channel access can be used for N slots, counting from the GC-PDCCH, or counting from the 1st UL (or flexible) slot. In yet another embodiment, the indication may be incorporated into a slot format indication (SFI) as a new resource type.

In the above, the signalling is binary, indicating either Cat-1 or Cat-2 for a given portion of COT. In a further embodiment, the use of Cat-1 channel access by a UE may be further conditioned on the relation between the (conditional) EDT or EIRP for the following CUL transmission and the EDT/EIRP used by gNB to initiate COT. For example, the EDT or EIRP used by the gNB may be preconfigured or indicated on GC-PDCCH. Alternatively, the gNB may signal the maximum EIRP or transmit (Tx) power allowed for Cat-1 channel access within the indicated time portions of the current COT. In an embodiment, the UE may determine the EIRP or Tx power to be used for CUL transmission (based on regular transmit power control). The UE may determine the EDT that would be used in Cat-2 channel access (according to EDT determination specified in standard for Cat-2 channel access). If the EIRP or max Tx power is higher than the max EIRP/Tx power indicated, or EDT is lower than indicated EDT limit, the UE may be configured to use Cat-2 channel access. Otherwise, the UE may be configured to use Cat-1 channel access on the indicated time portions of the current COT.

Figure 1:
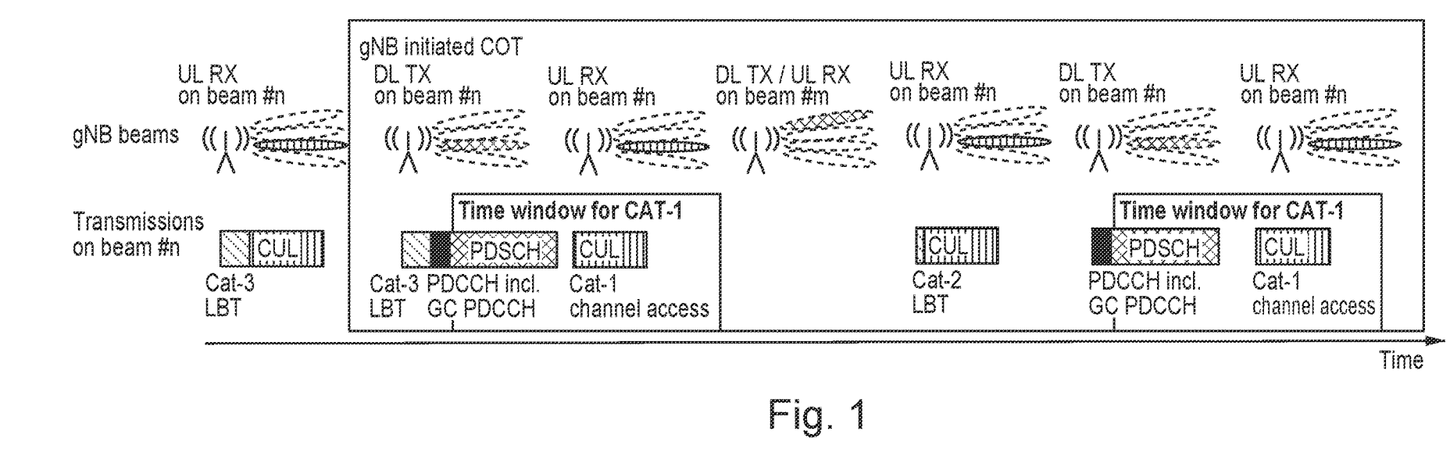
FIG. 1 illustrates an example diagram depicting the operation of a CUL channel access mechanism during beam based transmissions, according to an embodiment.

FIG. 1 illustrates an example diagram depicting the operation of a CUL channel access mechanism during beam based transmissions, according to an embodiment. The top row of FIG. 1 illustrates the gNB's beam for Tx or Rx as time evolves. The lower row of FIG. 1 illustrates the UL/DL transmissions on gNB beam #n.

As illustrated in the example of FIG. 1, a UE may first transmit CUL outside of a gNB initiated COT. As the UE needs to initiate its own COT, the UE will apply Cat-3 channel access. After that, the gNB may initiate a COT after acquiring channel access with Cat-3 channel access. The gNB may indicate the COT structure in GC PDCCH transmitted on beam #n. Based on detection of the GC PDCCH, the UE may transmit on CUL resource in the following time window with Cat-1 channel access. Next, the gNB may serve beam #m within the same COT. The gNB may also serve other beams, e.g., transmit SSBs and listen for CUL resources on the other beams, or transmit/receive data from other UEs on other beams. The gNB may return to beam #n to listen CUL resources. As the CUL resource is outside of the portion of COT supporting Cat-1 channel access on beam #n, the UE may perform Cat-2 channel access prior to the transmission. As illustrated in the example of FIG. 1, the gNB may return to serve beam #n, after serving other beam(s), e.g., by transmitting SSBs and listening CUL resources etc. The gNB may transmit GC PDCCH on beam #n, indicating a portion of COT resources supporting Cat-1 channel access on beam #n. Following this new indication received from the gNB, the UE may transmit CUL using Cat-1 channel access.

Figure 2A:
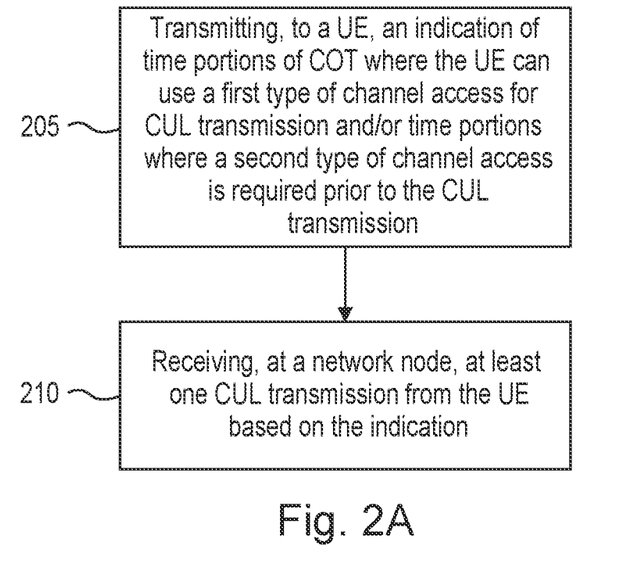
FIG. 2A illustrates an example flow diagram of a method, according to an embodiment.

FIG. 2A illustrates an example flow diagram of a method for channel access for semi-static uplink (UL) resources, according to an example embodiment. In certain example embodiments, the flow diagram of FIG. 2A may be performed by a network entity or network node in a communications system, such as LTE or 5G NR. In some example embodiments, the network entity performing the method of FIG. 2A may include or be included in a base station, access node, node B, eNB, gNB, NG-RAN node, transmission-reception points (TRPs), high altitude platform stations (HAPS), relay station or the like. In one embodiment, the network node performing the method of FIG. 2A may include a gNB, such as the gNB illustrated in the example of FIG. 1 or similar radio node.

As illustrated in the example of FIG. 2A, the method may include, at 205, transmitting or otherwise providing, to a UE, an indication of at least one of time portions of COT where the UE can use a first type of channel access for CUL transmission and/or time portions where a second type of channel access is required prior to the CUL transmission. In some embodiments, the first type of channel access may include Cat-1 channel access, and the second type of channel access may include Cat-2 channel access. According to one embodiment, the transmitting 205 may include transmitting the indication in a GC PDCCH. For example, in an embodiment, the transmitting 205 may include transmitting the indication in a separate GC PDCCH field indicating a time window with a duration of N slots, where the first type of channel access is used for the N slots. In a further embodiment, the transmitting 205 may include transmitting the indication in a slot format indication (SFI) as a new resource type.

As further illustrated in the example of FIG. 2A, the method may also include, at 210, receiving, at a network node, at least one CUL transmission from the UE based on the indication. In an embodiment, the time portions of the COT in which the UE can use the first type of channel access may be specific to a certain beam of the network node. According to certain embodiments, the use of the first type of channel access may be conditioned on a relation between an EDT or an EIRP for a following CUL transmission and the EDT or the EIRP used by the network node to initiate the COT. In some embodiments, the method may also include transmitting, to the UE, an indication of at least one of an EDT used by the network node, a maximum EIRP or transmit power allowed for LBT for the first type of channel access within the channel occupancy time.

Figure 2B:
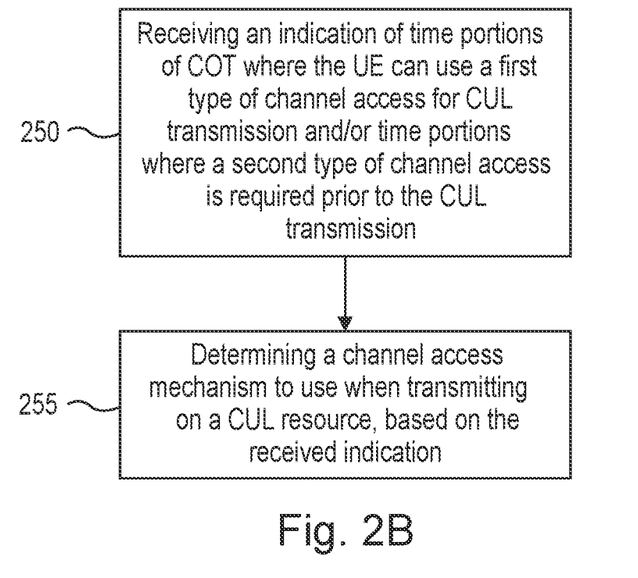
FIG. 2B illustrates an example flow diagram of a method, according to an embodiment.

FIG. 2B illustrates an example flow diagram of a method for channel access for semi-static uplink (UL) resources, according to one embodiment. In certain example embodiments, the flow diagram of FIG. 2B may be performed by a network entity or network node in a communications system, such as LTE or 5G NR. In some example embodiments, the network entity performing the method of FIG. 2B may include or be included in UE, sidelink UE, communication node, mobile equipment (ME), mobile station, mobile device, stationary device, IoT device, or other device. According to an embodiment, the method of FIG. 2B may include operations similar to those illustrated in the example of FIG. 3 or discussed elsewhere herein.

As illustrated in the example of FIG. 2B, the method may include, at 250, receiving, from a network node, an indication of at least one of time portions of COT where the UE can use a first type of channel access for CUL transmission and/or time portions where a second type of channel access is required prior to the CUL transmission. In some embodiments, the first type of channel access may include Cat-1 channel access, and the second type of channel access may include Cat-2 channel access. In an embodiment, the receiving 250 may include receiving the indication in a separate GC PDCCH field indicating a time window with a duration of N slots, where the first type of channel access is used for the N slots. According to an embodiment, the receiving 250 may include receiving the indication in a slot format indication (SFI) as a new resource type.

In some embodiments, the time portions of the COT in which the UE can use the first type of channel access or the second type of channel access may be specific to a certain beam of a network node. According to an embodiment, the time portions may include one or more of: a time window, at least one symbol, and/or at least one slot. According to certain embodiments, the indication may be a binary indication indicating the first type of channel access or the second type of channel access for a given time portion.

According to an embodiment, the receiving 250 may include receiving the indication upon detection of a GC PDCCH. In one embodiment, the detection of the GC PDCCH indicates a start of a predefined time window or predefined portion of remaining COT as a time portion of the COT in which the UE can use the first type of channel access. In some embodiments, the indicated at least one time portions of the COT in which the UE can use the first type of channel access may be specific for at least one beam associated to the detected GC PDCCH.

As further illustrated in the example of FIG. 2B, the method may include, at 255, based on the received indication, determining a channel access mechanism to use when transmitting on a CUL resource. In an embodiment, the determining 255 may include determining whether the CUL resource is within the time portions of the COT where the UE can use the first type of channel access and, when it is determined that the CUL resource is within the time portions of the COT where the UE can use the first type of channel access, the method may include transmitting on the CUL resource.

In a further embodiment, the determining 255 may include determining whether the CUL resource is within the time portions of the COT where the second type of channel access is required prior to the CUL transmission and, when it is determined that the CUL resource is within the time portions of the COT where the second type of channel access is required prior to the CUL transmission, the method may include performing LBT including single channel sensing and transmitting on the CUL resource with the second type of channel access when the LBT indicates a vacant channel. Alternatively, when it is determined that the CUL resource is not within the COT, the method comprises performing LBT including multiple channel sensing, such as Cat-3 or Cat-4 channel access, and transmitting on the CUL resource if the LBT indicates a vacant channel.

In an embodiment, the use of the first type of channel access may be conditioned on a relation between an EDT or an EIRP for a following CUL transmission and the EDT or the EIRP used by the network to initiate the COT and indicated to the UE.

According to an embodiment, the method may further include receiving an indication of at least one of an EDT used by the network, a maximum EIRP or transmit power allowed for LBT for the first type of channel access within the COT, and determining, by the UE, the EIRP or transmit power to be used for the CUL transmission and determining the energy detection threshold (EDT) that would be used in LBT for the second type of channel access. When the determined EIRP or transmit power is higher than the indicated maximum EIRP or transmit power, or when the determined EDT is lower than the indicated EDT, using the LBT for the second type of channel access.

Figure 3:
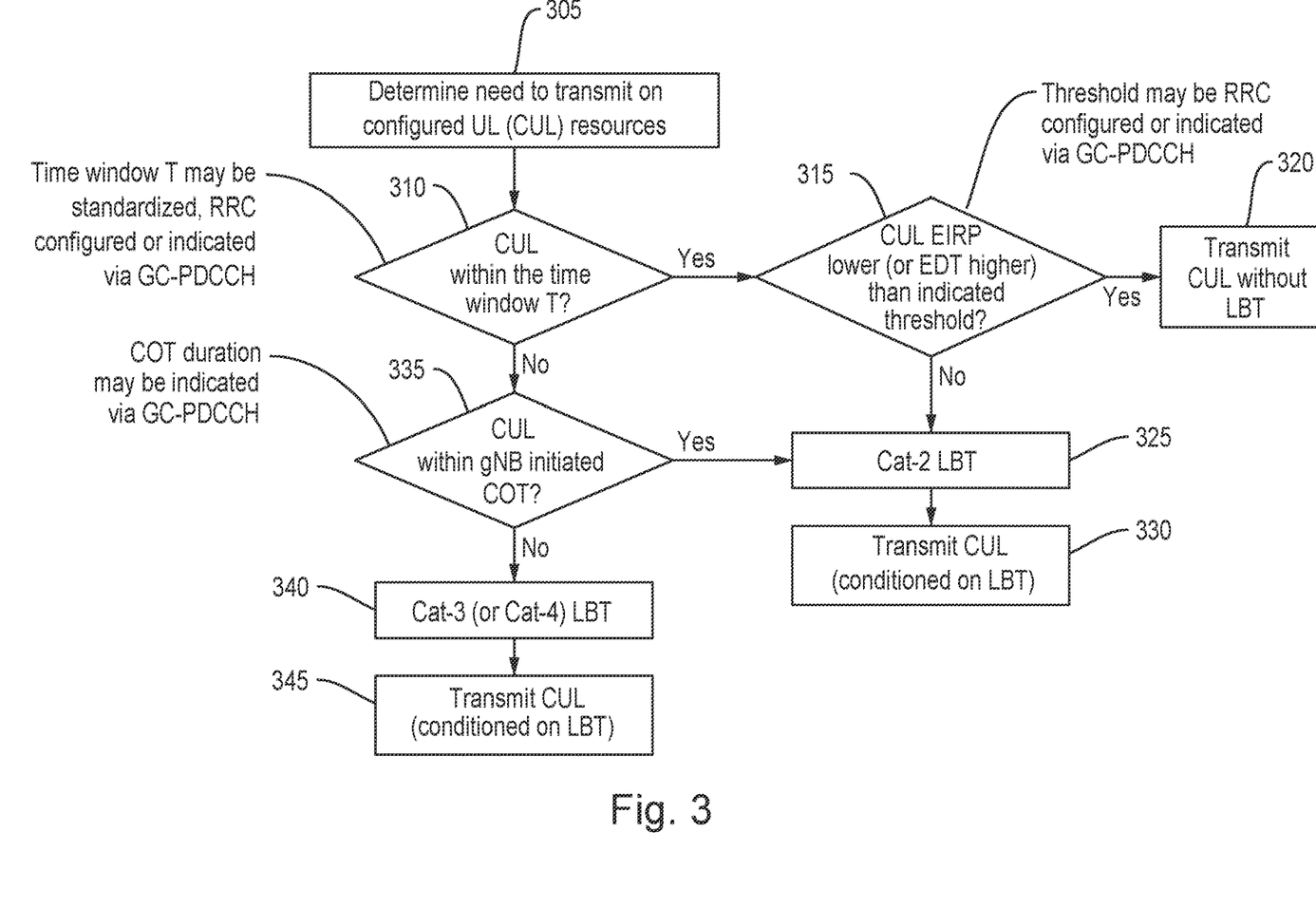
FIG. 3 illustrates an example flow diagram of a method, according to an embodiment.

FIG. 3 illustrates an example flow diagram of a method, which may be performed by a UE, according to certain embodiments. As illustrated in the example of FIG. 3, at 305, the method may include determining a need to transmit on CUL resources. In case of CG PUSCH, UE MAC receives data from higher layers to be transmitted, while the UE does not receive any dynamically scheduled UL grants. In case of SR, UE MAC receives data from higher layers to be transmitted. It may also be the configured time to transmit periodic or semi-persistent CSI report.

As further illustrated in the example of FIG. 3, the method may include, at 310, determining whether the CUL resource is within the portion of the gNB initiated COT during which Cat-1 channel access is allowed or not. This may be based on a time window determined based on detection time of CG-PDCCH, or information contained on the decoded CG-PDCCH. If it is determined that the CUL resource is within the portion of the gNB initiated COT during which Cat-1 channel access is allowed, then, at 315, the method may include determining whether CUL transmission's EIRP or corresponding EDT is lower or higher, respectively, than a threshold indicated by gNB. It is noted that procedure 315 may be optional. If the EIRP is lower or EDT is higher than the indicated threshold, the method may include, at 320, transmitting on CUL resource with Cat-1 channel access. If the EIRP is not lower or EDT is not higher than the indicated threshold, the method may include, at 325, performing Cat-2 channel access and, at 330, transmitting on CUL resource if the LBT indicates a vacant channel.

As also illustrated in the example of FIG. 3, if it is determined that the CUL resource is not within the portion of the gNB initiated COT during which Cat-1 channel access is allowed, then, at 335, the method may include determining whether the CUL resource is within the gNB initiated COT. If the CUL resource is within the gNB initiated COT, then the method may include, at 325, performing Cat-2 channel access and, at 330, transmitting on CUL resource if the LBT indicates a vacant channel. If the CUL resource is not within the gNB initiated COT, the method may include, at 340, performing Cat-3 or Cat-4 channel access and, at 345, transmitting on CUL resource if the LBT indicates the channel to be vacant.

As discussed herein, CUL transmission may refer to transmissions, e.g., CG PUSCH, before which LBT may need to be performed. It may be possible that a UE does not support LBT. In such a case, the indication of time portions (slots, symbols) of gNB initiated COT in which a UE can use Cat-1 channel access means short-term activation/deactivation of configured CUL resources: UE can perform CUL transmission only during the indicated portions.

It should be noted that the channel access may also depend on CUL resource configuration. Multiple starting positions may be used on a CG PUSCH resource as known from Rel-16 NR-U. The purpose of multiple starting positions is to support efficient CG PUSCH resource usage by resource overbooking. The same resource may be allocated to multiple UEs, but with different starting positions. Once the UE with earlier starting position occupies the channel, the LBT for the other UEs is expected to block channel access and to prevent collision. When such configuration is used, the Cat-1 channel access and the presented mechanisms is applicable for the UE with the first starting position. However, in beam-based operation used at 60 GHz band, the inter-UE channel access blocking (preventing collision) may not be reliable and, therefore, multiple starting positions are not expected to be used at 60 GHz band.

Figure 4A:
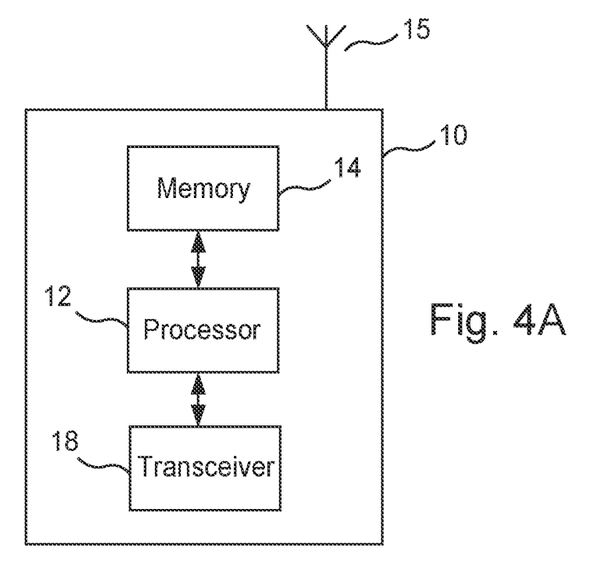
FIG. 4A illustrates an example block diagram of an apparatus, according to an embodiment.

FIG. 4A illustrates an example of an apparatus 10 according to an embodiment. In an embodiment, apparatus 10 may be a node, host, or server in a communications network or serving such a network. For example, apparatus 10 may be a network node, a sensing node, satellite, base station, a Node B, an evolved Node B (eNB), 5G Node B or access point, next generation Node B (NG-NB or gNB), TRP, HAPS, integrated access and backhaul (IAB) node, and/or a WLAN access point, associated with a radio access network, such as a LTE network, 5G or NR. In some example embodiments, apparatus 10 may be gNB or other similar radio node, for instance.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 4A.

As illustrated in the example of FIG. 4A, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, or any other processing means, as examples. While a single processor 12 is shown in FIG. 4A, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication or communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media, or other appropriate storing means. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15, or may include any other appropriate transceiving means. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (via an uplink, for example).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device), or an input/output means.

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry/means or control circuitry/means. In addition, in some embodiments, transceiver 18 may be included in or may form a part of transceiver circuitry/ means.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be or may be a part of a network element or RAN node, such as a base station, access point, Node B, eNB, gNB, TRP, HAPS, IAB node, WLAN access point, or the like. In one example embodiment, apparatus 10 may be a gNB or other radio node, or may be a CU and/or DU of a gNB. According to certain embodiments, apparatus 10 may be controlled by memory 14 and processor 12 to perform the functions associated with any of the embodiments described herein. For example, in some embodiments, apparatus 10 may be configured to perform one or more of the processes depicted in any of the flow charts or signaling diagrams described herein, such as those illustrated in FIGS. 2A, 2B or 3, or any other method described herein. In some embodiments, as discussed herein, apparatus 10 may be configured to perform a procedure relating to channel access for semi-static uplink (UL) resources, as discussed elsewhere herein, for example.

Figure 4B:
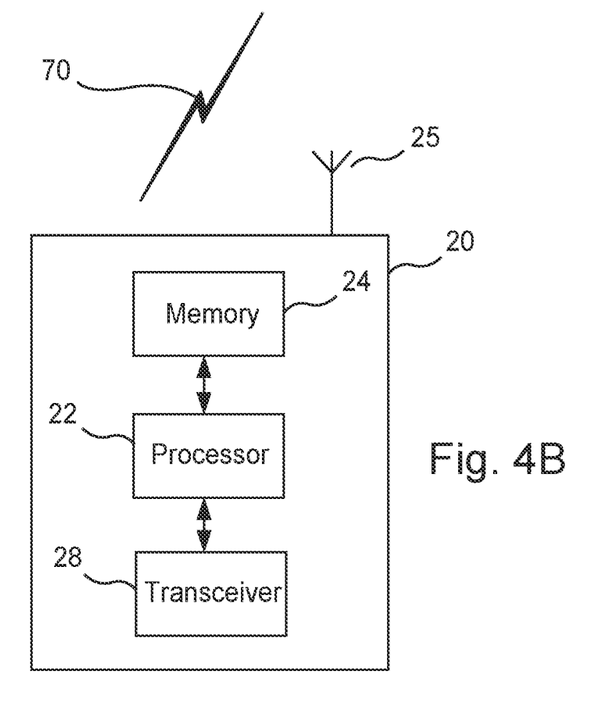
FIG. 4B illustrates an example block diagram of an apparatus, according to an embodiment.

FIG. 4B illustrates an example of an apparatus 20 according to another embodiment. In an embodiment, apparatus 20 may be a node or element in a communications network or associated with such a network, such as a UE, communication node, mobile equipment (ME), mobile station, mobile device, stationary device, IoT device, or other device. As described herein, a UE may alternatively be referred to as, for example, a mobile station, mobile equipment, mobile unit, mobile device, user device, subscriber station, wireless terminal, tablet, smart phone, IoT device, sensor or NB-IoT device, a watch or other wearable, a head-mounted display (HMD), a vehicle, a drone, a medical device and applications thereof (e.g., remote surgery), an industrial device and applications thereof (e.g., a robot and/or other wireless devices operating in an industrial and/or an automated processing chain context), a consumer electronics device, a device operating on commercial and/or industrial wireless networks, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 4B.

As illustrated in the example of FIG. 4B, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 4B, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, SL UE, relay UE, mobile device, mobile station, ME, IoT device and/or NB-IoT device, or the like, for example. According to certain embodiments, apparatus 20 may be controlled by memory 24 and processor 22 to perform the functions associated with any of the embodiments described herein, such as one or more of the operations illustrated in, or described with respect to, FIG. 2A, 2B, or 3, or any other method described herein. For example, in an embodiment, apparatus 20 may be controlled to perform a process relating to channel access for semi-static uplink (UL) resources, as described in detail elsewhere herein.

In some embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

In view of the foregoing, certain example embodiments provide several technological improvements, enhancements, and/or advantages over existing technological processes and constitute an improvement at least to the technological field of wireless network control and/or management. For example, as discussed in detail above, certain embodiments allow for a UE with configured UL resource to determine the correct channel access mechanism. In example embodiments, there is no need to fallback, e.g., to constant use of Cat-2 channel access throughout gNB initiated COT; instead, Cat-1 channel access can be used when possible. More frequent use of Cat-1 channel access reduces the transmission uncertainty inherent for LBT schemes and improves the UL latency when long delays due to LBT blocking transmission are avoided. Accordingly, the use of certain example embodiments results in improved functioning of communications networks and their nodes, such as base stations, eNBs, gNBs, and/or IoT devices, UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and may be executed by a processor.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality of example embodiments may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality of example embodiments may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

Example embodiments described herein may apply to both singular and plural implementations, regardless of whether singular or plural language is used in connection with describing certain embodiments. For example, an embodiment that describes operations of a single network node may also apply to embodiments that include multiple instances of the network node, and vice versa.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

We claim:

1. An apparatus, comprising:
at least one processor; and
at least one memory comprising computer program code,
the at least one memory and computer program code configured, with the at least one processor, to cause the apparatus at least to perform:
receiving an indication of at least one of time portions of channel occupancy time (COT) where the apparatus can use a first type of channel access for configured uplink (CUL) transmission or time portions where a second type of channel access is required prior to the configured uplink (CUL) transmission;
based on the received indication, determining a channel access mechanism to use when transmitting on a configured uplink (CUL) resource by determining whether the configured uplink (CUL) resource is within the time portions of the channel occupancy time (COT) where the second type of channel access is required prior to the configured uplink (CUL) transmission; and
when it is determined that the configured uplink (CUL) resource is within the time portions of the channel occupancy time (COT) where the second type of channel access is required prior to the configured uplink (CUL) transmission, performing listen before talk (LBT) comprising single channel sensing and transmitting on the configured uplink (CUL) resource when the listen before talk (LBT) indicates a vacant channel, or
when it is determined that the configured uplink (CUL) resource is not within the channel occupancy time (COT), performing listen before talk (LBT) comprising multiple channel sensing and transmitting on the configured uplink (CUL) resource when the listen before talk (LBT) indicates a vacant channel.

2. The apparatus of claim 1, wherein the determining comprises determining whether the configured uplink (CUL) resource is within the time portions of the channel occupancy time (COT) where the apparatus can use the first type of channel access, and
when it is determined that the configured uplink (CUL) resource is within the time portions of the channel occupancy time (COT) where the apparatus can use the first type of channel access, the at least one memory and computer program code configured, with the at least one processor, to cause the apparatus at least to perform: transmitting on the configured uplink (CUL) resource.

3. The apparatus of claim 1, wherein the receiving comprises receiving the indication upon detection of a group common (GC) physical downlink control channel (PDCCH).

4. The apparatus of claim 3, where the detection of the group common (GC) physical downlink control channel (PDCCH) indicates a start of a predefined time window or predefined portion of remaining channel occupancy time (COT) as a time portion of the channel occupancy time (COT) in which the apparatus can use the first type of channel access.

5. The apparatus of claim 3, wherein the indicated at least one time portions of the channel occupancy time in which the apparatus can use the first type of channel access are specific for at least one beam associated to the detected group common (GC) physical downlink control channel (PDCCH).

6. The apparatus of claim 1, wherein the receiving comprises receiving the indication in a separate group common (GC) physical downlink control channel (PDCCH) field indicating a time window with a duration of N slots, wherein the first type of channel access is used for the N slots.

7. The apparatus of claim 1, wherein the receiving comprises receiving the indication in a slot format indication (SFI) as a new resource type.

8. The apparatus of claim 1, wherein the time portions of the channel occupancy time in which the apparatus can use the first type of channel access or the second type of channel access are specific to a certain beam of a network node.

9. The apparatus of claim 1, wherein the time portions comprises at least one of: a time window, at least one symbol, or at least one slot.

10. The apparatus of claim 1, wherein the indication comprises a binary indication indicating the first type of channel access or the second type of channel access for a given time portion.

11. The apparatus of claim 1, wherein the use of the first type of channel access is conditioned on a relation between an energy detection threshold (EDT) or an effective isotropically radiated power (EIRP) for a following configured uplink (CUL) transmission and the energy detection threshold (EDT) or the effective isotropically radiated power (EIRP) used by the network to initiate the channel occupancy time (COT) and indicated to the apparatus.

12. An apparatus, comprising:
at least one processor; and
at least one memory comprising computer program code,
the at least one memory and computer program code configured, with the at least one processor, to cause the apparatus at least to perform:
receiving an indication of at least one of time portions of channel occupancy time (COT) where the apparatus can use a first type of channel access for configured uplink (CUL) transmission or time portions where a second type of channel access is required prior to the configured uplink (CUL) transmission; and
based on the received indication, determining a channel access mechanism to use when transmitting on a configured uplink (CUL) resource,
wherein the use of the first type of channel access is conditioned on a relation between an energy detection threshold (EDT) or an effective isotropically radiated power (EIRP) for a following configured uplink (CUL) transmission and the energy detection threshold (EDT) or the effective isotropically radiated power (EIRP) used by the network to initiate the channel occupancy time (COT) and indicated to the apparatus,
wherein the at least one memory and computer program code are further configured, with the at least one processor, to cause the apparatus at least to perform:
receiving an indication of at least one of an energy detection threshold (EDT) used by the network, a maximum effective isotropically radiated power (EIRP) or transmit power allowed for listen before talk (LBT) for the first type of channel access within the channel occupancy time;
determining the effective isotropically radiated power (EIRP) or transmit power to be used for the configured uplink (CUL) transmission and determining the energy detection threshold (EDT) that would be used in listen before talk (LBT) for the second type of channel access; and
when the determined effective isotropically radiated power (EIRP) or transmit power is higher than the indicated maximum effective isotropically radiated power (EIRP) or transmit power, or when the determined energy detection threshold (EDT) is lower than the indicated energy detection threshold (EDT), using the listen before talk (LBT) for the second type of channel access.

13. An apparatus, comprising:
at least one processor; and
at least one memory comprising computer program code,
the at least one memory and computer program code configured, with the at least one processor, to cause the apparatus at least to perform:
transmitting, to a user equipment, an indication of at least one of time portions of channel occupancy time (COT) where the user equipment can use a first type of channel access for configured uplink (CUL) transmission or time portions where a second type of channel access is required prior to the configured uplink (CUL) transmission; and
receiving configured uplink (CUL) transmission from the user equipment based on the indication, by
when the configured uplink (CUL) resource is within the time portions of the channel occupancy time (COT) where the second type of channel access is required prior to the configured uplink (CUL) transmission, receiving on the configured uplink (CUL) resource when first listen before talk (LBT) indicates a vacant channel, or
when it the configured uplink (CUL) resource is not within the channel occupancy time (COT), receiving on the configured uplink (CUL) resource when second listen before talk (LBT) comprising multiple channel sensing indicates a vacant channel.

14. The apparatus of claim 13, wherein the transmitting comprises transmitting the indication in a group common (GC) physical downlink control channel (PDCCH).

15. The apparatus of claim 13, wherein the transmitting comprises transmitting the indication in a separate group common (GC) physical downlink control channel (PDCCH) field indicating a time window with a duration of N slots, wherein the first type of channel access is used for the N slots.

16. The apparatus of claim 13, wherein the transmitting comprises transmitting the indication in a slot format indication (SFI) as a new resource type.

17. The apparatus of claim 13, wherein the time portions of the channel occupancy time in which the user equipment can use the first type of channel access are specific to a certain beam of a network node.

18. The apparatus of claim 13, wherein the use of the first type of channel access is conditioned on a relation between an energy detection threshold (EDT) or an effective isotropically radiated power (EIRP) for a following configured uplink (CUL) transmission and the energy detection threshold (EDT) or the effective isotropically radiated power (EIRP) used by the network node to initiate the channel occupancy time (COT).

19. The apparatus of claim 13, wherein the at least one memory and computer program code are configured, with the at least one processor, to cause the apparatus at least to perform:
transmitting, to the user equipment, an indication of at least one of an energy detection threshold (EDT) used by the network node, a maximum effective isotropically radiated power (EIRP) or transmit power allowed for listen before talk (LBT) for the first type of channel access within the channel occupancy time.

* * * * *